US012528638B2

(12) United States Patent
Brown et al.

(10) Patent No.: US 12,528,638 B2
(45) Date of Patent: Jan. 20, 2026

(54) PILL DISPENSING ASSEMBLY AND MODULE INCLUDING THE SAME

(71) Applicant: Kristi Nixon Brown, Cedar Park, TX (US)

(72) Inventors: Kristi Nixon Brown, Cedar Park, TX (US); Roger Gagnon, Rockville, MD (US)

(73) Assignee: Kristi Nixon Brown, Cedar Park, TX (US)

( * ) Notice: Subject to any disclaimer, the term of this patent is extended or adjusted under 35 U.S.C. 154(b) by 0 days.

(21) Appl. No.: 18/602,219

(22) Filed: Mar. 12, 2024

(65) Prior Publication Data

US 2025/0289647 A1 Sep. 18, 2025

(51) Int. Cl.
*A61J 7/00* (2006.01)
*B65D 83/04* (2006.01)

(52) U.S. Cl.
CPC ........ *B65D 83/0481* (2013.01); *A61J 7/0076* (2013.01); *B65D 2255/00* (2013.01)

(58) Field of Classification Search
CPC .......... A61J 1/03; A61J 7/0048; A61J 7/0076; A61J 7/0084; B65D 83/0481; B65D 2250/00
USPC .................. 221/241, 263–265, 304; 206/528
See application file for complete search history.

(56) References Cited

U.S. PATENT DOCUMENTS 401,829 A 4/1889 Hall
4,460,106 A * 7/1984 Moulding, Jr. .... B65D 83/0409 221/241
4,582,225 A 4/1986 Peden et al.
5,791,515 A 8/1998 Khan et al.
6,168,046 B1 1/2001 Galesi
7,404,500 B2 * 7/2008 Marteau ............. B65D 83/0409 221/229
7,854,326 B1 12/2010 Beckett
7,896,195 B2 * 3/2011 Limback ............. A47L 15/4409 221/265
8,666,543 B2 * 3/2014 MacVittie .......... B65D 83/0409 221/241
9,150,346 B1 10/2015 Aramian
(Continued)

OTHER PUBLICATIONS

Amazon: KitchenArt 57010 Select-A-Spice Auto-Measure Carousel Professional Series, Satin Revolving Spice Rack; Jul. 15, 2024; 11 pages; https://www.amazon.com/KitchenArt-Select-Auto-Measure-Carousel-Professional/dp/B0000VLQTS/ref=asc_df_B0000VLQTS/?tag=hyprod-20&linkCode=df0&hvadid=692875362841&hvpos=&hvnetw=g&hvrand=16434137402900759869&hvpone=&hvptwo=&hvqmt=&hvdev=c&hvdvcmdl=&hvlocint=&hvlocphy=9192293&hvtargid=pla-2281435177178&mcid=4306b.

*Primary Examiner* — Luan K Bui
(74) *Attorney, Agent, or Firm* — Howard & Howard Attorneys PLLC

(57) ABSTRACT

A pill dispensing assembly for dispensing pills includes a pill housing extending along a pill housing axis and defining a pill housing interior configured to retain pills for dispensing. The pill housing also defines a pill housing outlet configured to allow dispensing of the pills. The pill dispensing assembly also includes a dispensing housing coupled to the pill housing. The dispensing housing defines a dispensing housing outlet spaced from the pill housing outlet with respect to the pill housing axis. The pill dispensing assembly further includes an insert extending along and moveable with respect to an insert axis and disposed between the pill housing outlet and the dispensing housing outlet with respect to said pill housing axis. The insert defines an insert channel that is alignable with the pill housing outlet.

23 Claims, 18 Drawing Sheets

(56) References Cited

U.S. PATENT DOCUMENTS

| | | | | |
|---|---|---|---|---|
| 9,849,069 | B1 | 12/2017 | Khatri | |
| 10,198,556 | B2 | 2/2019 | Herman et al. | |
| 10,457,474 | B2 | 10/2019 | Graziano | |
| 11,464,709 | B2 | 10/2022 | Brown | |
| 2002/0070227 | A1* | 6/2002 | Ferruccio | A61J 7/02<br>221/133 |
| 2005/0269348 | A1* | 12/2005 | Limback | A47L 15/4409<br>221/263 |
| 2017/0231871 | A1* | 8/2017 | Aldasouqi | B65D 83/04<br>221/203 |
| 2022/0105007 | A1* | 4/2022 | Brown | A61J 1/03 |

* cited by examiner

PILL DISPENSING ASSEMBLY AND MODULE INCLUDING THE SAME

BACKGROUND OF THE DISCLOSURE

1. Field of the Disclosure

This invention relates generally to the field of pill dispensing assemblies, and in particular to a pill dispensing assembly for use in a pill dispensing module.

2. Description of the Related Art

Pill dispensing assemblies have been a critical part of the healthcare industry for many years. They are designed to provide a controlled and accurate method of dispensing medication to patients, both in facilities and at patient's homes, ensuring that the correct dosage is given at the right time. Current systems range from simple manual dispensers to complex automated machines that can handle multiple medications and dosages. Despite these advancements, there are still several challenges and limitations associated with the current state of pill dispensing assemblies.

One of the primary challenges with current pill dispensing assemblies is the potential for human error. This challenge generally increases as the number of pills that a patient is required to take increases. Even with automated systems, there is still a need for manual input or oversight, which can lead to mistakes in dosage or timing. Additionally, many current systems are not user-friendly, particularly for elderly patients or those with limited dexterity or cognitive function. This can lead to confusion and misuse, potentially resulting in underdosing, overdosing, or missed doses. Furthermore, current systems often lack the ability to track and monitor medication usage, which is crucial for managing chronic conditions and ensuring patient adherence to medication regimens.

Another limitation of current pill dispensing assemblies is their inability to handle a wide variety of pill sizes and shapes. Many systems are designed for specific types of pills, limiting their versatility and requiring multiple dispensers for patients with multiple medications. Additionally, current pill dispensing assemblies often struggle with dispensing the correct number of pills, particularly when dealing with small or irregularly shaped pills. This can lead to inaccurate dosages or dispensing the incorrect pill, which can have serious health implications. Lastly, many current pill dispensing systems lack robust security features, raising concerns about medication theft or misuse, particularly in settings like nursing homes or hospitals.

To this end, there remains a need for an improved pill dispensing assembly.

SUMMARY OF THE INVENTION AND ADVANTAGES

A pill dispensing assembly for dispensing pills includes a pill housing extending along a pill housing axis and defining a pill housing interior configured to retain pills for dispensing. The pill housing also defines a pill housing outlet configured to allow dispensing of the pills. The pill dispensing assembly also includes a dispensing housing coupled to the pill housing. The dispensing housing defines a dispensing housing outlet spaced from the pill housing outlet with respect to the pill housing axis. The pill dispensing assembly further includes an insert extending along and moveable with respect to an insert axis and disposed between the pill housing outlet and the dispensing housing outlet with respect to said pill housing axis. The insert defines an insert channel that is alignable with the pill housing outlet for regulating the movement of pills from the pill housing interior, to the pill housing outlet, and to the dispensing housing outlet.

Accordingly, having the insert disposed between the pill housing outlet and the dispensing housing inlet allows controlled movement of pills from the pill housing interior to the dispensing housing, which may be based on size of the pills. Second, having the insert disposed between the pill housing outlet and the dispensing housing inlet allows a user to select a desired pill size to dispense from the pill dispensing assembly.

BRIEF DESCRIPTION OF THE DRAWINGS

Other advantages of the present disclosure will be readily appreciated, as the same becomes better understood by reference to the following detailed description when considered in connection with the accompanying drawings.

DETAILED DESCRIPTION OF THE INVENTION

Figure 1:
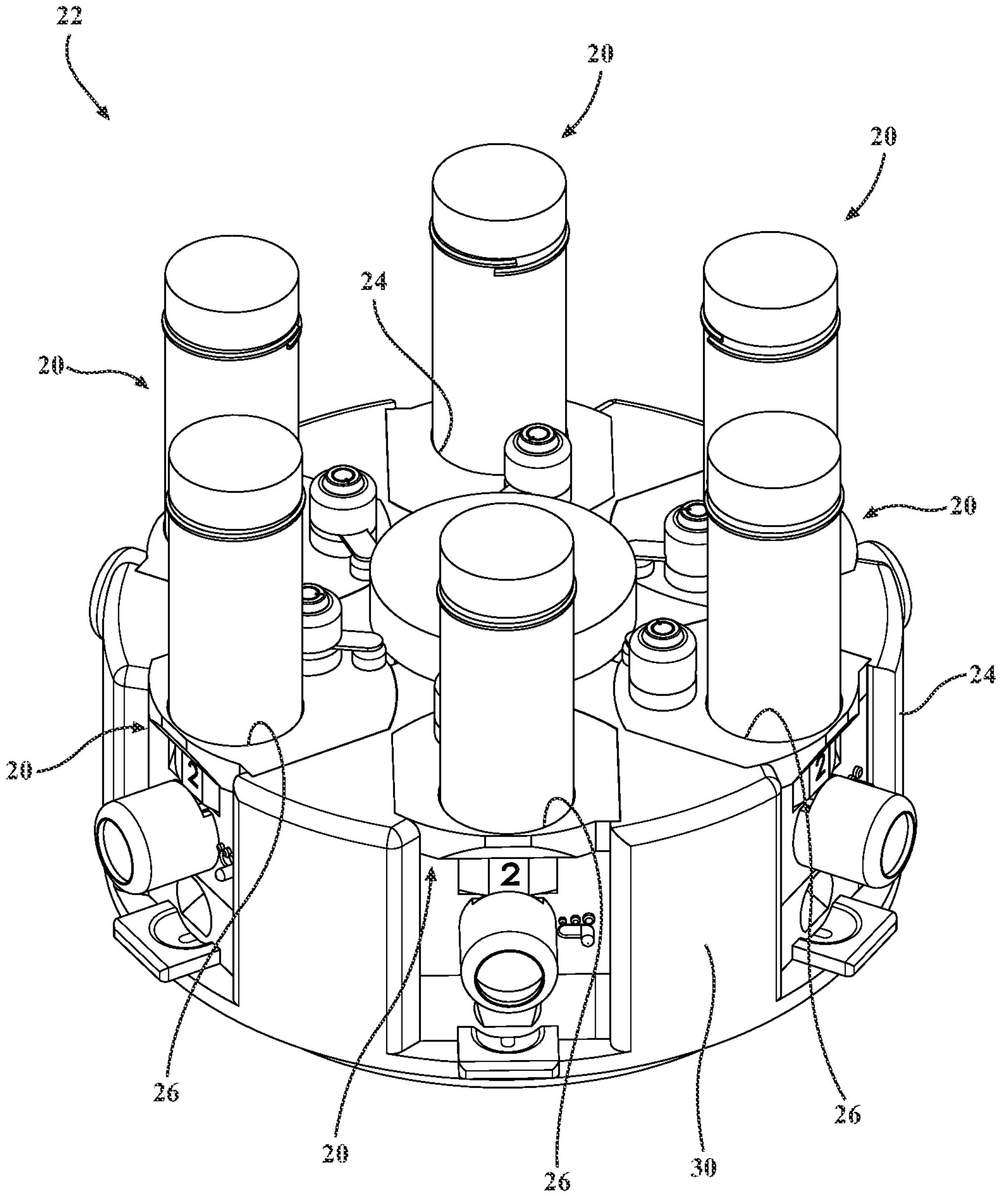
FIG. 1 is a top perspective view of a pill dispensing module including a module housing and a plurality of pill dispensing assemblies.
Figure 2:
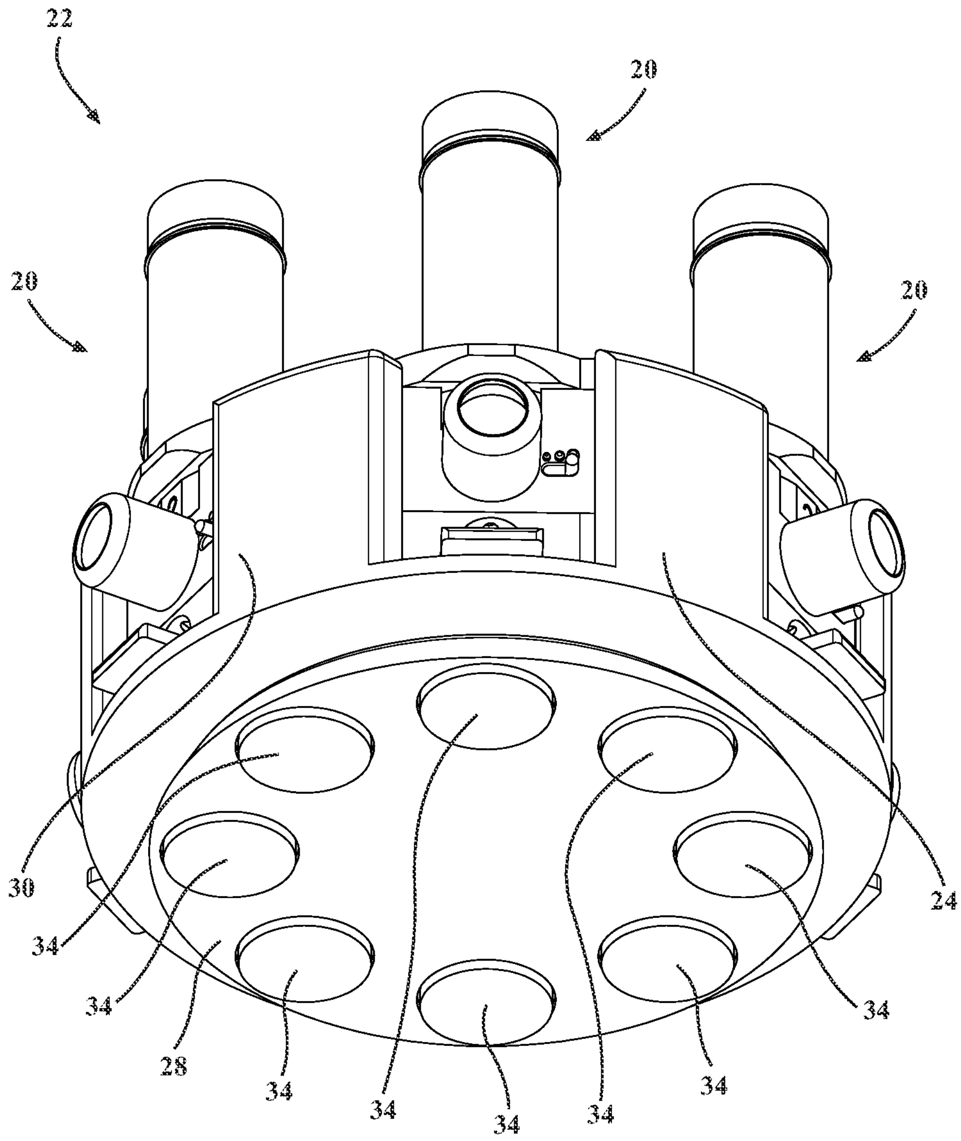
FIG. 2 is bottom perspective view of the pill dispensing module including the module housing and the plurality of pill dispensing assemblies.

With reference to the Figures, wherein like numerals indicate like parts throughout the several views, a pill dispensing assembly 20 of a pill dispensing module 22 is generally shown in FIGS. 1 and 2. The pill dispensing module 22 also includes a module housing 24 defining a plurality of pockets 26. The pill dispensing module 22 may include any number of pill dispensing assemblies 20, such as one pill dispensing assembly 20, two pill dispensing assemblies 20, three pill dispensing assemblies 20, four pill dispensing assemblies 20, five pill dispensing assemblies 20, or six or more pill dispensing assemblies 20. As a non-limiting example, as shown in FIGS. 1 and 2, the pill dispensing module 22 includes six pill dispensing assemblies 20. Each pill dispensing assembly 20 is disposable in one of the pockets 26.

With continued reference to FIGS. 1 and 2, the module housing 24 may include a base portion 28 and a body portion 30, with the base portion 28 configured to rest on a surface and the base portion 28 coupled to the pill dispensing assembly 20. The base portion 28 may define the plurality of pockets 26. The body portion 30 may be rotatable with respect to the base portion 28. Examples of rotation of the body portion 30 with respect to the base portion 28 are disclosed in U.S. Pat. Nos. 11,464,709 and 11,826,312, the disclosures of which are hereby incorporated by reference in their entirety. The pill dispensing module 22 may include a plurality of grips 34 disposed on the base portion 28 of the module housing 24.

With reference to FIGS. 3-6, the pill dispensing assembly 20 includes a pill housing 36 extending along a pill housing axis A1. The pill housing 36 defines a pill housing interior 38 that is configured to retain pills for dispensing. The pill housing 36 also defines a pill housing outlet 40 that is configured to allow dispensing of the pills. It is to be appreciated that the pill housing 36 may be one component or the pill housing 36 may be multiple components. For example, the pill housing 36 may be further defined as a pill housing body 42 and a pill housing cap 44 each defining the pill housing interior 38. The pill housing cap 44 may be removably coupled to the pill housing body 42. For example, the pill housing cap 44 may be threadingly coupled to the pill housing body 42. Alternatively, or additionally, the pill housing cap 44 may be lockable to the pill housing body 42 such that the pill housing cap 44 is locked to the pill housing body 42. Although not shown in the FIGS., it is to be appreciated that the pill dispensing assembly 20 may include a locking mechanism for locking the pill housing cap 44 to the pill housing body 42.

The pill dispensing assembly 20 further includes a dispensing housing 46 coupled to the pill housing 36. It is to be appreciated that the dispensing housing 46 and the pill housing 36 may be integral to one another (i.e., one piece) or may be separate components (i.e., two or more pieces). The dispensing housing 46 defines a dispensing housing inlet 48 that is adjacent to the pill housing outlet 40 and that is configured to receive the pills from the pill housing outlet 40. The dispensing housing 46 may define a dispensing housing outlet 50 spaced from the pill housing outlet 40 with respect to the pill housing axis A1. The dispensing housing outlet may be configured as a chute and may be configured to receive pills from the pill housing outlet 40 for dispensing the pills. It is to be appreciated that the dispensing housing 46 may be one component or the dispensing housing 46 may be multiple components. For example, the dispensing housing 46 may be further defined as an upper dispensing housing 52 and a lower dispensing housing 54 coupled to the upper dispensing housing 52. In such embodiments, the upper dispensing housing 52 may define the dispensing housing inlet 48 and the lower dispensing housing 54 may define the dispensing housing outlet 50. In one embodiment, the dispensing housing 46 is further defined as the upper dispensing housing 52, the lower dispensing housing 54, and a base dispensing housing 56 coupled to the lower dispensing housing 54 such that the lower dispensing housing 54 is disposed between the upper dispensing housing 52 and the base dispensing housing 56. The pill dispensing assembly 20 may include a pill catch tray 58 coupled to the dispensing housing 46 for catching pills as they exit the dispensing housing outlet 50.

The pill dispensing module 22 also includes an insert 60 extending along and moveable with respect to an insert axis A2. For example, the insert 60 may be coupled to and rotatably about an insert shaft 62 that extends along the insert axis A2. The insert 60 may have any suitable shape, such as a disc configuration. The insert axis A2 may be parallel to the pill housing axis A1. The insert 60 is disposed between the pill housing outlet 40 and the dispensing housing outlet 50 with respect to the pill housing axis A1. The insert 60 regulates the movement of pills from the pill housing outlet 40 to the dispensing housing outlet 50. Specifically, the insert 60 defines an insert channel 64, as best shown in FIGS. 10A-10I, that is alignable with the pill housing outlet 40, and typically the dispensing housing inlet 48, for regulating movement of pills from the pill housing interior 38, through the pill housing outlet 40, through the dispensing housing inlet 48, through the insert channel 64, and through the dispensing housing outlet 50.

Having the pill dispensing module 22 with the insert 60 offers several advantages. First, having the insert 60 disposed between the pill housing outlet 40 and the dispensing housing outlet 50 allows controlled movement of pills from the pill housing interior 38 to the dispensing housing outlet 50, which may be based on size of the pills, as described in further detail below. Second, having the insert 60 disposed between the pill housing outlet 40 and the dispensing housing outlet 50 allows a user to select a desired pill size to dispense from the pill dispensing assembly 20.

Typically, the insert channel 64 is disposed about the insert axis A2. For example, the insert channel 64 may spiral about the insert axis A2. In such embodiments, the insert channel 64 has a channel cross-sectional area 66, as indicated by both the single hashed lines in FIGS. 10A-10I and the double hashed lines in FIGS. 10A-10I. The channel cross-sectional area 66 of the insert channel 64 may spiral about the insert axis A2. The channel cross-sectional area 66 may change radially about the insert axis A2. Specifically, the insert channel 64 may have a first insert wall 68 and a second insert wall 70 defining the insert channel 64, with the first insert wall 68 disposed between the insert axis A2 and the second insert wall 70 with respect to the insert axis A2. Typically, the first insert wall 68 has a first radius R1 and the second insert wall 70 has a second radius R2, with the second radius R2 being greater than the first radius R1. To increase the channel cross-sectional area 66, the second radius R2 may increase radially with respect to the insert axis A2. Alternatively, to increase the channel cross-sectional area 66, the first radius R1 may decrease radially with respect to the insert axis A2. Alternatively, to increase the channel cross-sectional area, the first radius R1 may decrease radially with respect to the insert axis A2 and the second radius R2 may increase radially with respect to the insert axis A2.

Figure 10A:
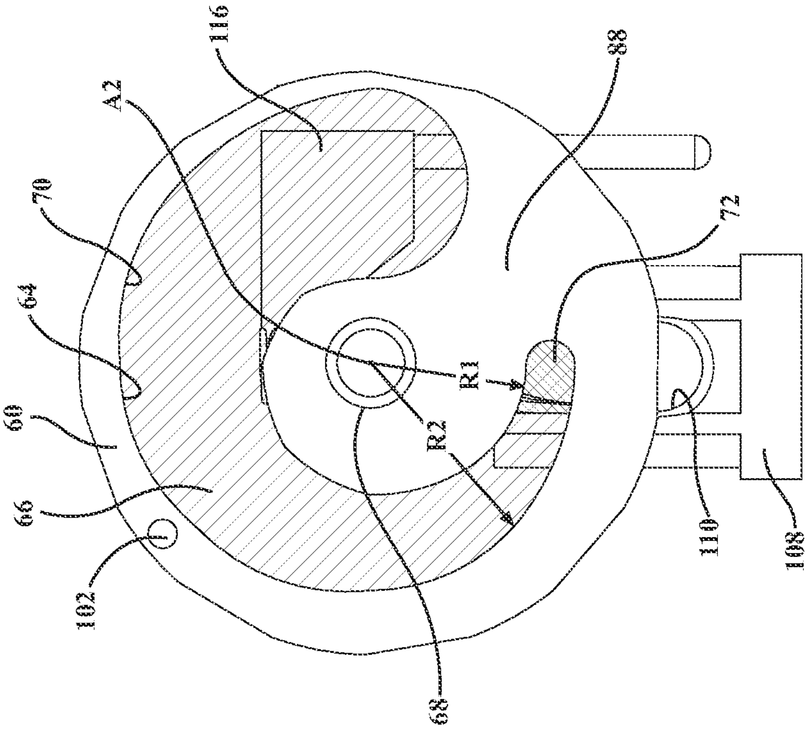
FIG. 10A is a top view of the insert, the second insert, and the third insert, with the insert being in an example first position.
Figure 10B:
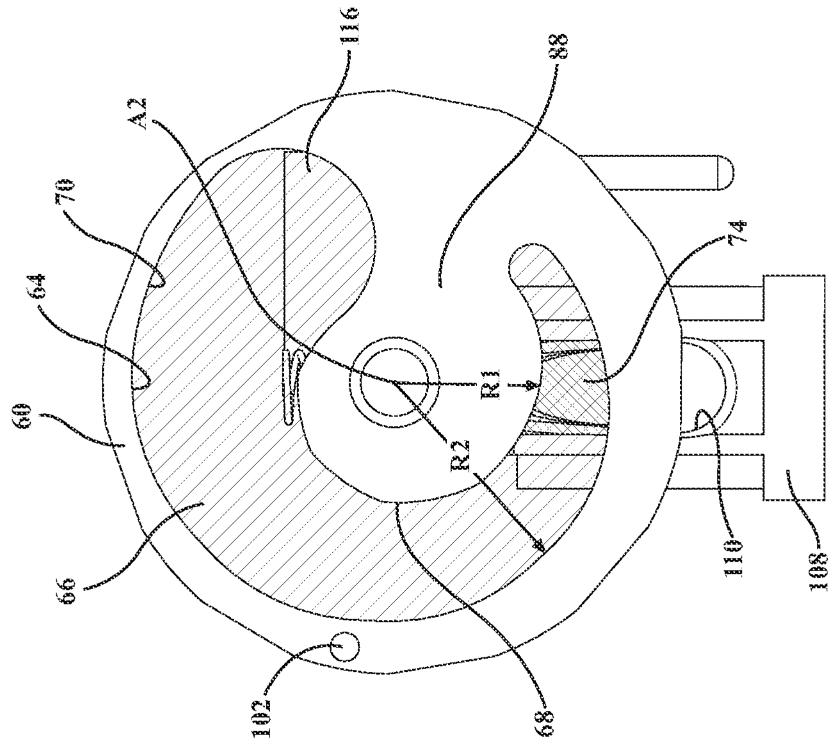
FIG. 10B is a top view of the insert, the second insert, and the third insert, with the insert being in an example second position.

The insert 60 may be moveable, such as rotatable about the insert axis A2, into a first position, as shown in FIG. 10A, and a second position, as shown in FIG. 10B, different from the first position with respect to the dispensing housing 46. When the insert 60 is in the first position, the channel cross-sectional area 66 has a first cross-sectional area 72, as indicated by the double hashed lines in FIG. 10A, aligned with the pill housing outlet 40 with respect to the pill housing axis A1. When the insert 60 is in the second position, the channel cross-sectional area 66 has a second cross-sectional area 74, as indicated by the double hashed lines in FIG. 10B, aligned with the pill housing outlet 40 with respect to the pill housing axis A1. When present, the second cross-sectional area 74 is typically greater than the first cross-sectional area 72. Having the second cross-sectional area 74 being greater than the first cross-sectional area 72 allows the insert 60 to be moved with respect to the insert axis A2, such as rotated about the insert axis A2, to a desired position for aligning either the first cross-sectional area 72 or the second cross-sectional area 74 with the pill housing outlet 40, based on the desired pill to retrieve from the pill housing interior 38. As shown in FIGS. 10A and 10B, the insert channel 64 may be continuously defined between the first cross-sectional area 72 and the second cross-sectional area 74.

Figure 10D:
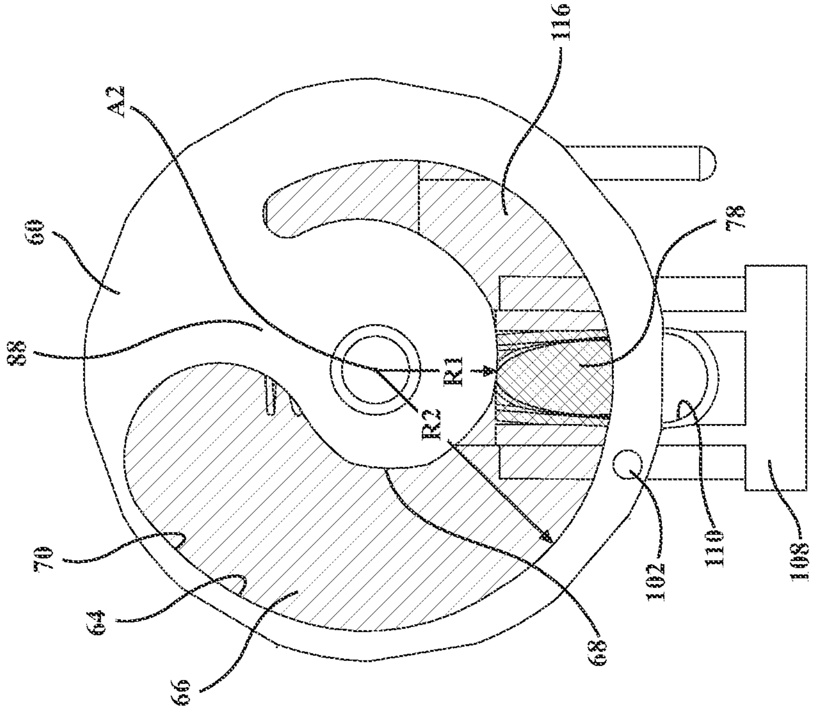
FIG. 10D is a top view of the insert, the second insert, and the third insert, with the insert being in an example fourth position.
Figure 10C:
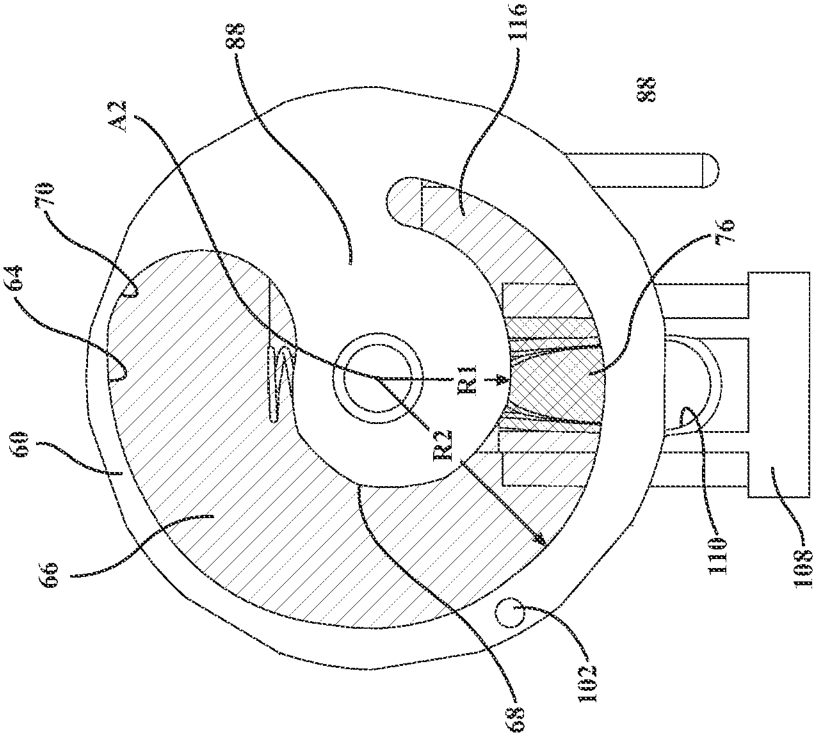
FIG. 10C is a top view of the insert, the second insert, and the third insert, with the insert being in an example third position.

Although not required, the insert 60 may be moveable, such as rotatable about the insert axis A2, into a third position different from the second position with respect to the dispensing housing 46, as shown in FIG. 10C. When the insert 60 is in the third position, the channel cross-sectional area 66 has a third cross-sectional area 76, as indicated by the double hashed lines in FIG. 10C, that is aligned with the pill housing outlet 40 with respect to the pill housing axis A1. Typically, the third cross-sectional area 76 is greater than the second cross-sectional area 74. Having the third cross-sectional area 76 being greater than the second cross-sectional area 74 allows the insert 60 to be moved with respect to the insert axis A2, such as rotated about the insert axis A2, to a desired position for aligning the first cross-sectional area 72, the second cross-sectional area 74, or the third cross-sectional area 76 with the pill housing outlet 40, based on the desired pill to retrieve from the pill housing interior 38. As shown in FIGS. 10A-10C, the insert channel 64 may be continuously defined between the first cross-sectional area 72, the second cross-sectional area 74, and the third cross-sectional area 76.

Although not required, the insert 60 may be moveable, such as rotatable about the insert axis A2, into a fourth position different from the third position with respect to the dispensing housing 46, as shown in FIG. 10D. When the insert 60 is in the fourth position, the channel cross-sectional area 66 has a fourth cross-sectional area 78, as indicated by the double hashed lines in FIG. 10D, that is aligned with the pill housing outlet 40 with respect to the pill housing axis A1. Typically, the fourth cross-sectional area 78 is greater than the third cross-sectional area 76. Having the fourth cross-sectional area 78 being greater than the third cross-sectional area 76 allows the insert 60 to be moved, such as rotated about the insert axis A2, to a desired position for aligning the first cross-sectional area 72, the second cross-sectional area 74, the third cross-sectional area 76, or the fourth cross-sectional area 78 with the pill housing outlet 40, based on the desired pill to retrieve from the pill housing interior 38. As shown in FIGS. 10A-10D, the insert channel 64 may be continuously defined between the first cross-sectional area 72, the second cross-sectional area 74, the third cross-sectional area 76, and the fourth cross-sectional area 78.

Figure 10E:
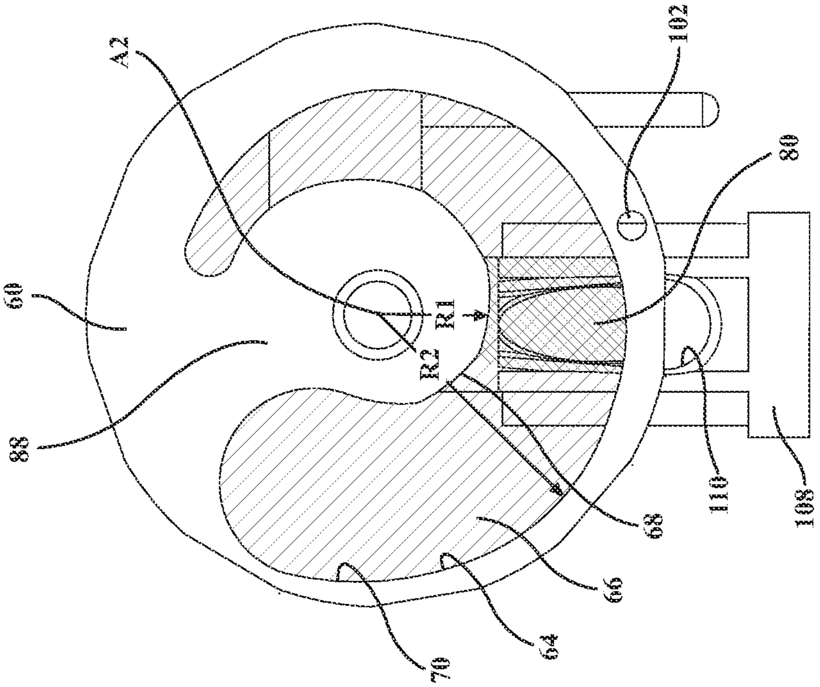
FIG. 10E is a top view of the insert, the second insert, and the third insert, with the insert being in an example fifth position.

Although not required, the insert 60 may be moveable, such as rotatable about the insert axis A2, into a fifth position different from the fourth position with respect to the dispensing housing 46, as shown in FIG. 10E. When the insert 60 is in the fifth position, the channel cross-sectional area 66 has a fifth cross-sectional area 80, as indicated by the double hashed lines in FIG. 10E, that is aligned with the pill housing outlet 40 with respect to the pill housing axis A1. Typically, the fifth cross-sectional area 80 is greater than the fourth cross-sectional area 78. Having the fifth cross-sectional area 80 being greater than the fourth cross-sectional area 78 allows the insert 60 to be moved, such as rotated about the insert axis A2, to a desired position for aligning the first cross-sectional area 72, the second cross-sectional area 74, the third cross-sectional area 76, the fourth cross-sectional area 78, or the fifth cross-sectional area 80 with the pill housing outlet 40, based on the desired pill to retrieve from the pill housing interior 38. As shown in FIGS. 10A-10E, the insert channel 64 may be continuously defined between the first cross-sectional area 72, the second cross-sectional area 74, the third cross-sectional area 76, the fourth cross-sectional area 78, and the fifth cross-sectional area 80.

Figure 10F:
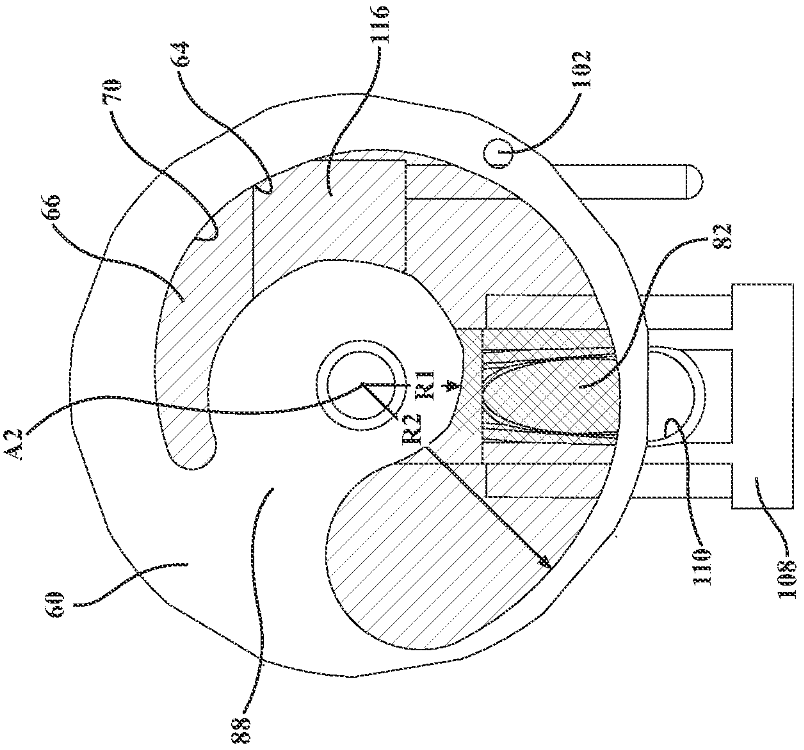
FIG. 10F is a top view of the insert, the second insert, and the third insert, with the insert being in an example sixth position.

Although not required, the insert 60 may be moveable, such as rotatable about the insert axis A2, into a sixth position different from the fifth position with respect to the dispensing housing 46, as shown in FIG. 10F. When the insert 60 is in the sixth position, the channel cross-sectional area 66 has a sixth cross-sectional area 82, as indicated by the double hashed lines in FIG. 10F, that is aligned with the pill housing outlet 40 with respect to the pill housing axis A1. Typically, the sixth cross-sectional area 82 is greater than the fifth cross-sectional area 80. Having the sixth cross-sectional area 82 being greater than the fifth cross-sectional area 80 allows the insert 60 to be moved, such as rotated about the insert axis A2, to a desired position for aligning the first cross-sectional area 72, the second cross-sectional area 74, the third cross-sectional area 76, the fourth cross-sectional area 78, the fifth cross-sectional area 80, or the sixth cross-sectional area 82 with the pill housing outlet 40, based on the desired pill to retrieve from the pill housing interior 38. As shown in FIGS. 10A-10F, the insert channel 64 may be continuously defined between the first cross-sectional area 72, the second cross-sectional area 74, the third cross-sectional area 76, the fourth cross-sectional area 78, the fifth cross-sectional area 80, and the sixth cross-sectional area 82.

Figure 10G:
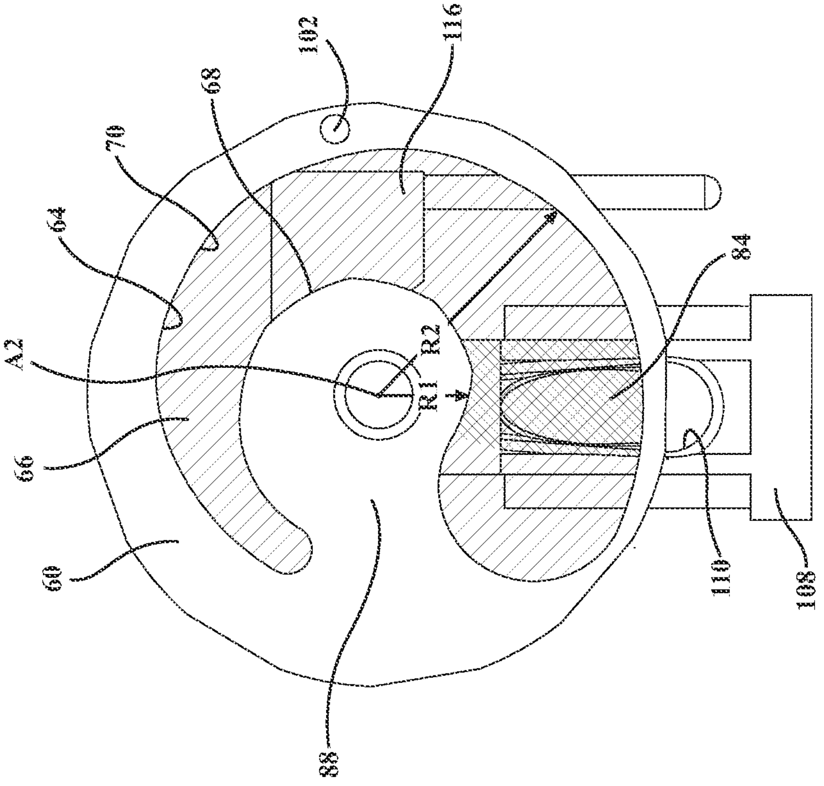
FIG. 10G is a top view of the insert, the second insert, and the third insert, with the insert being in an example seventh position.

Although not required, the insert 60 may be moveable, such as rotatable about the insert axis A2, into a seventh position different from the sixth position with respect to the dispensing housing 46, as shown in FIG. 10G. When the insert 60 is in the seventh position, the channel cross-sectional area 66 has a seventh cross-sectional area 84, as indicated by the double hashed lines in FIG. 10G, that is aligned with the pill housing outlet 40 with respect to the pill housing axis A1. Typically, the seventh cross-sectional area 84 is greater than the sixth cross-sectional area 82. Having the seventh cross-sectional area 84 being greater than the sixth cross-sectional area 82 allows the insert 60 to be moved, such as rotated about the insert axis A2, to a desired position for aligning the first cross-sectional area 72, the second cross-sectional area 74, the third cross-sectional area 76, the fourth cross-sectional area 78, the fifth cross-sectional area 80, the sixth cross-sectional area 82, or the seventh cross-sectional area 84 with the pill housing outlet 40, based on the desired pill to retrieve from the pill housing interior 38. As shown in FIGS. 10A-10G, the insert channel 64 may be continuously defined between the first cross-sectional area 72, the second cross-sectional area 74, the third cross-sectional area 76, the fourth cross-sectional area 78, the fifth cross-sectional area 80, the sixth cross-sectional area 82, and the seventh cross-sectional area 84.

Figure 10H:
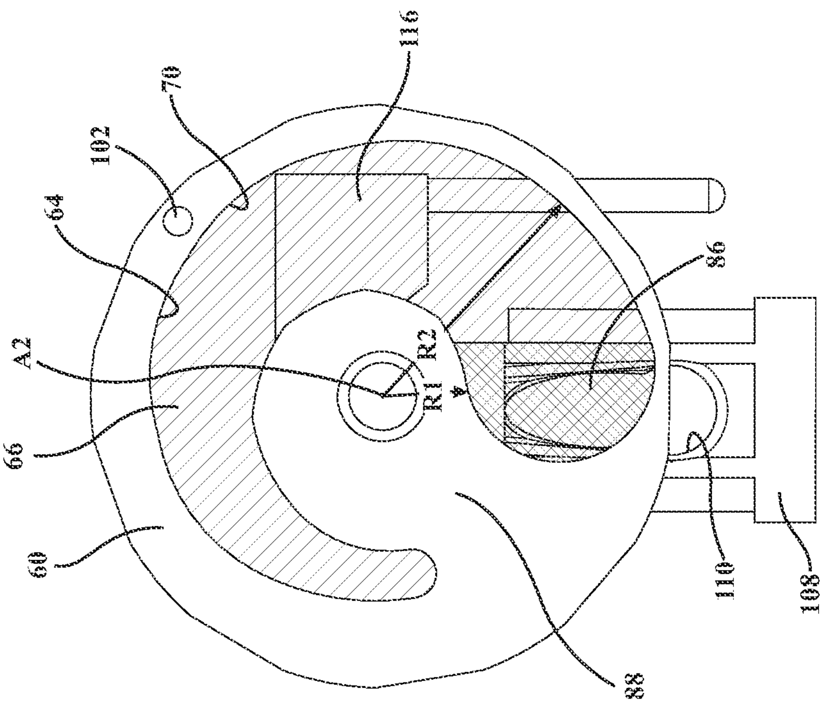
FIG. 10H is a top view of the insert, the second insert, and the third insert, with the insert being in an example eighth position.

Although not required, the insert 60 may be moveable, such as rotatable the insert axis A2, into an eighth position different from the seventh position with respect to the dispensing housing 46, as shown in FIG. 10H. When the insert 60 is in the eighth position, the channel cross-sectional area 66 has an eighth cross-sectional area 86, as indicated by the double hashed lines in FIG. 10H, that is aligned with the pill housing outlet 40 with respect to the pill housing axis A1. Typically, the eighth cross-sectional area 86 is greater than the seventh cross-sectional area 84. Having the eighth cross-sectional area 86 being greater than the seventh cross-sectional area 84 allows the insert 60 to be moved, such as rotated about the insert axis A2 to a desired position for aligning the first cross-sectional area 72, the second cross-sectional area 74, the third cross-sectional area 76, the fourth cross-sectional area 78, the fifth cross-sectional area 80, the sixth cross-sectional area 82, the seventh cross-sectional area 84, or the eighth cross-sectional area 86 with the pill housing outlet 40, based on the desired pill to retrieve from the pill housing interior 38. As shown in FIGS. 10A-10G, the insert channel 64 may be continuously defined between the first cross-sectional area 72, the second cross-sectional area 74, the third cross-sectional area 76, the fourth cross-sectional area 78, the fifth cross-sectional area 80, the sixth cross-sectional area 82, the seventh cross-sectional area 84, and the eighth cross-sectional area 86. It is to be appreciated that the insert 60 may be moveable, such as rotatably, into any number of desired positions and that the channel cross-sectional area 66 may have any number of cross-sectional areas defined.

Figure 10I:
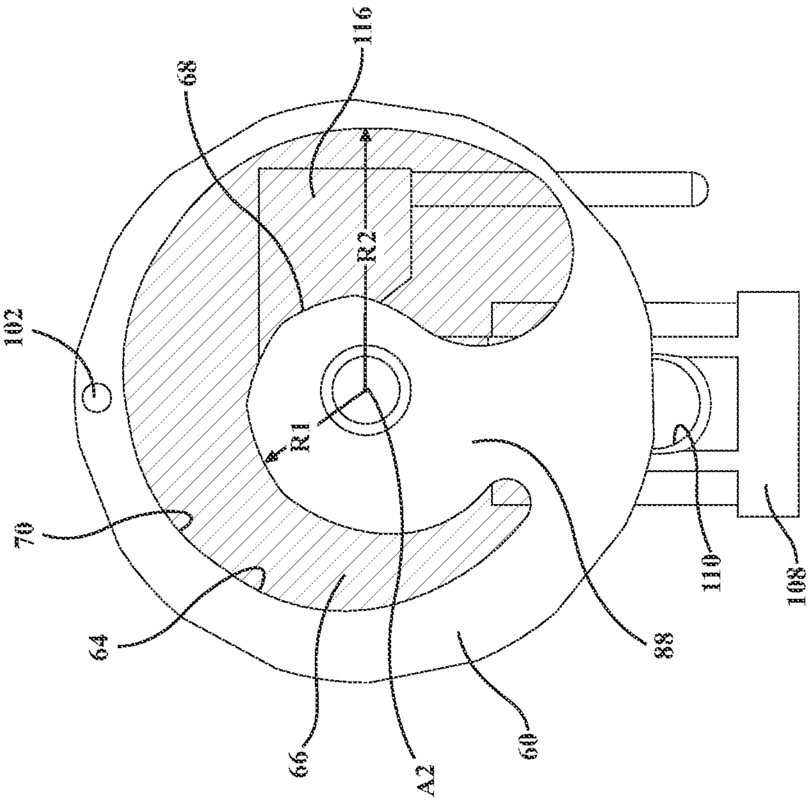
FIG. 10I is a top view of the insert, the second insert, and the third insert, with the insert being in an example block position.
Figure 11:
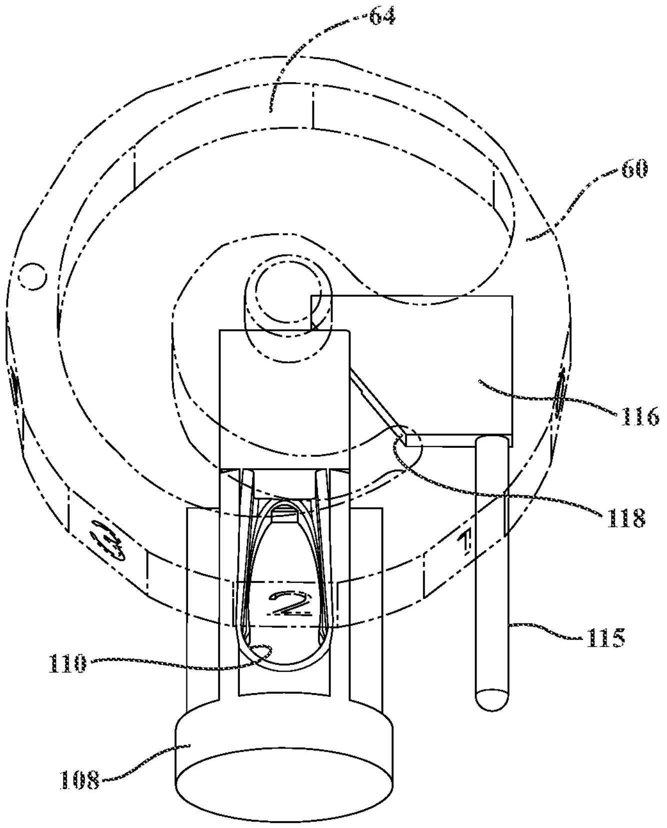
FIG. 11 is a top perspective view of the insert, the second insert, and the third insert, with the insert shown in phantom.
Figure 12:
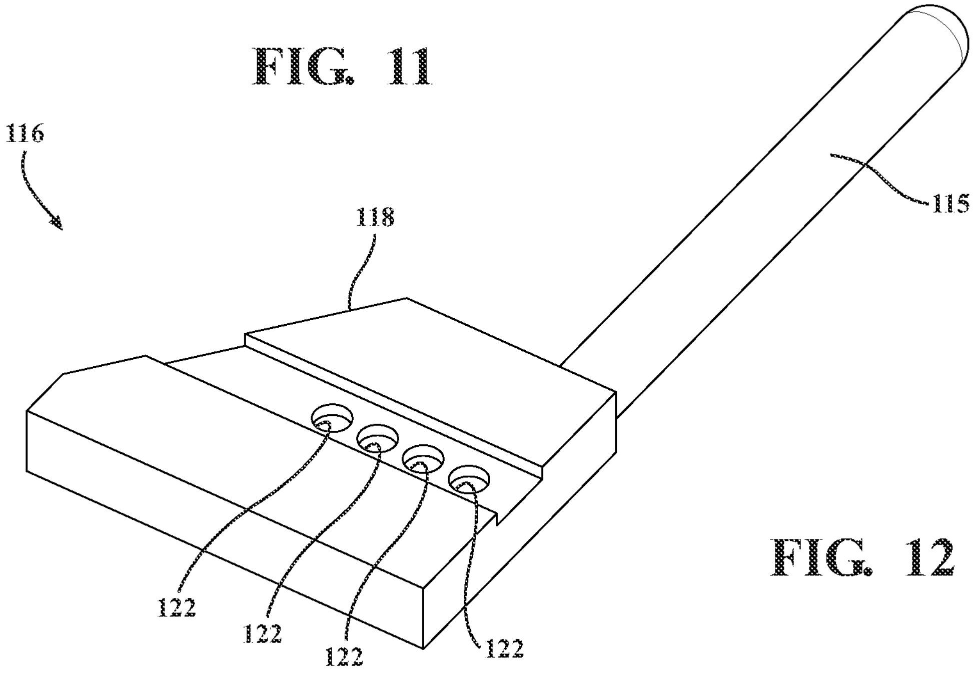
FIG. 12 is perspective view of the third insert.

In some embodiments, the insert 60 may be moveable, such as rotatable about the insert axis A2, between the first position, as shown in FIG. 10A, and a block position, as shown in FIG. 10I. When in the first position, the insert channel 64 is aligned with the pill housing outlet 40 with respect to the pill housing axis A1 for allowing pills to pass through the pill housing outlet 40 and through the insert channel 64. In such embodiments, the insert 60 includes a blocking portion 88 that extends between the insert axis A2 and an outer insert surface 90 of the insert 60. The blocking portion 88 may be further defined as a bridge extending between the first insert wall 68 and the second insert wall 70. When the insert 60 is in the block position, the blocking portion 88 of the insert 60 prevents pills from moving from the pill housing outlet 40 to the dispensing housing outlet 50.

Figure 3:
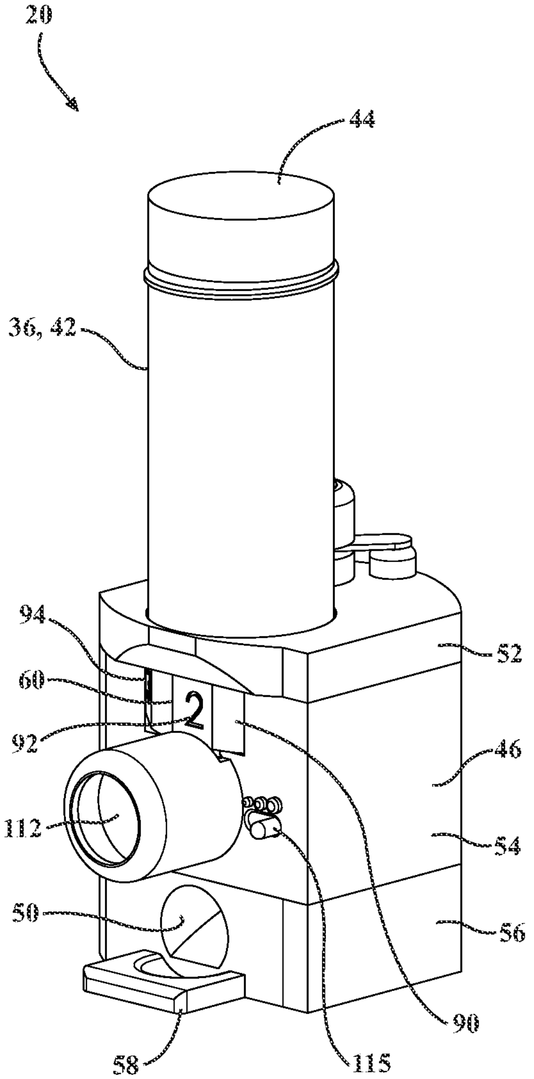
FIG. 3 is a side perspective view of the pill dispensing assembly including a pill housing, a dispensing housing coupled to the pill housing, and an insert.
Figure 4:
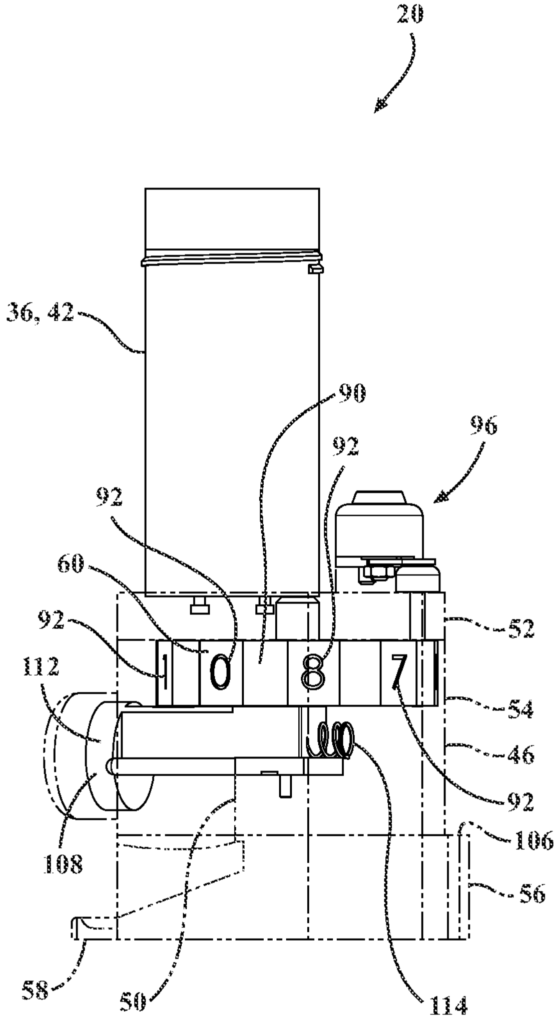
FIG. 4 is a side view of the pill dispensing assembly with the dispensing housing shown in phantom and with the pill dispensing assembly including a second insert.
Figure 5:
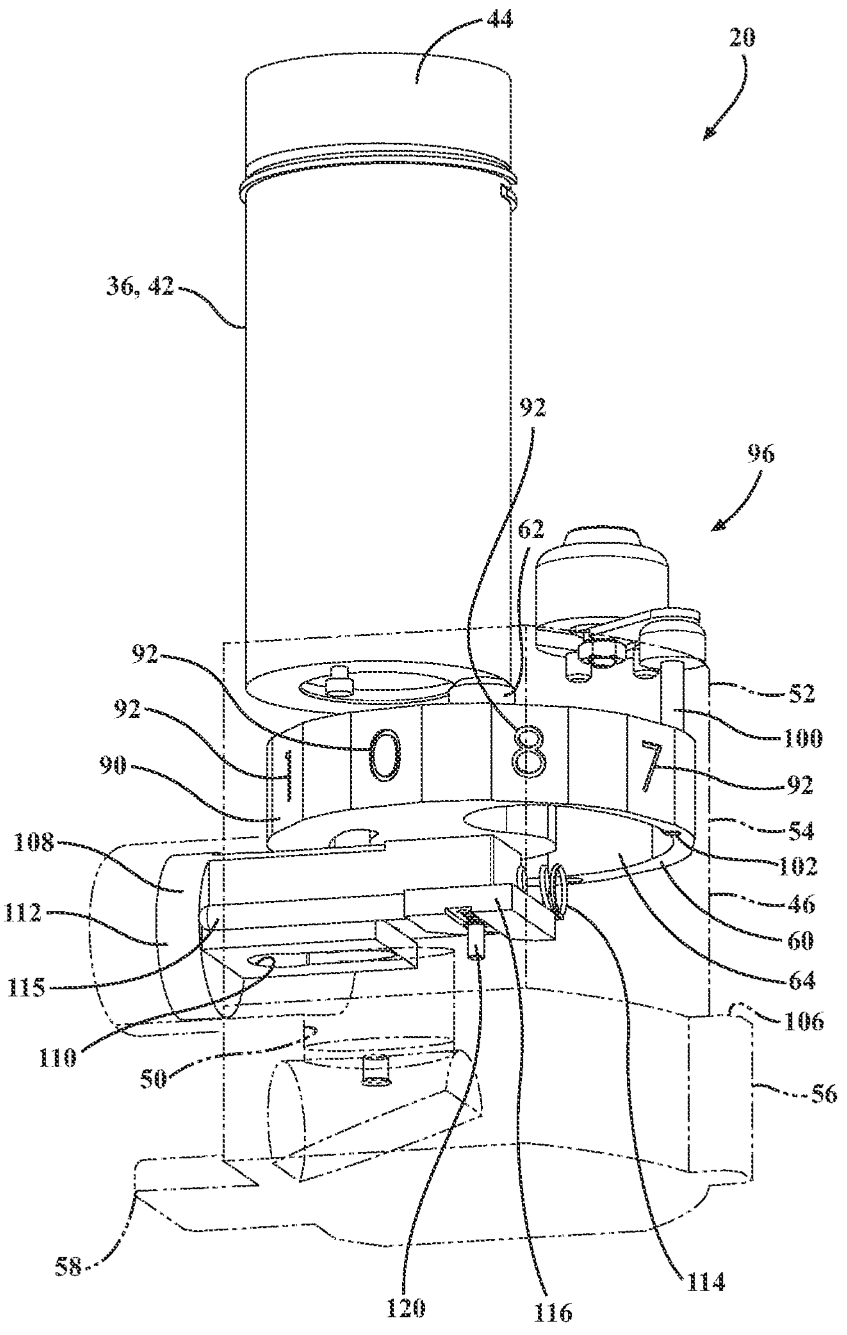
FIG. 5 is a side perspective view of the pill dispensing assembly with the dispensing housing shown in phantom.
Figure 6:
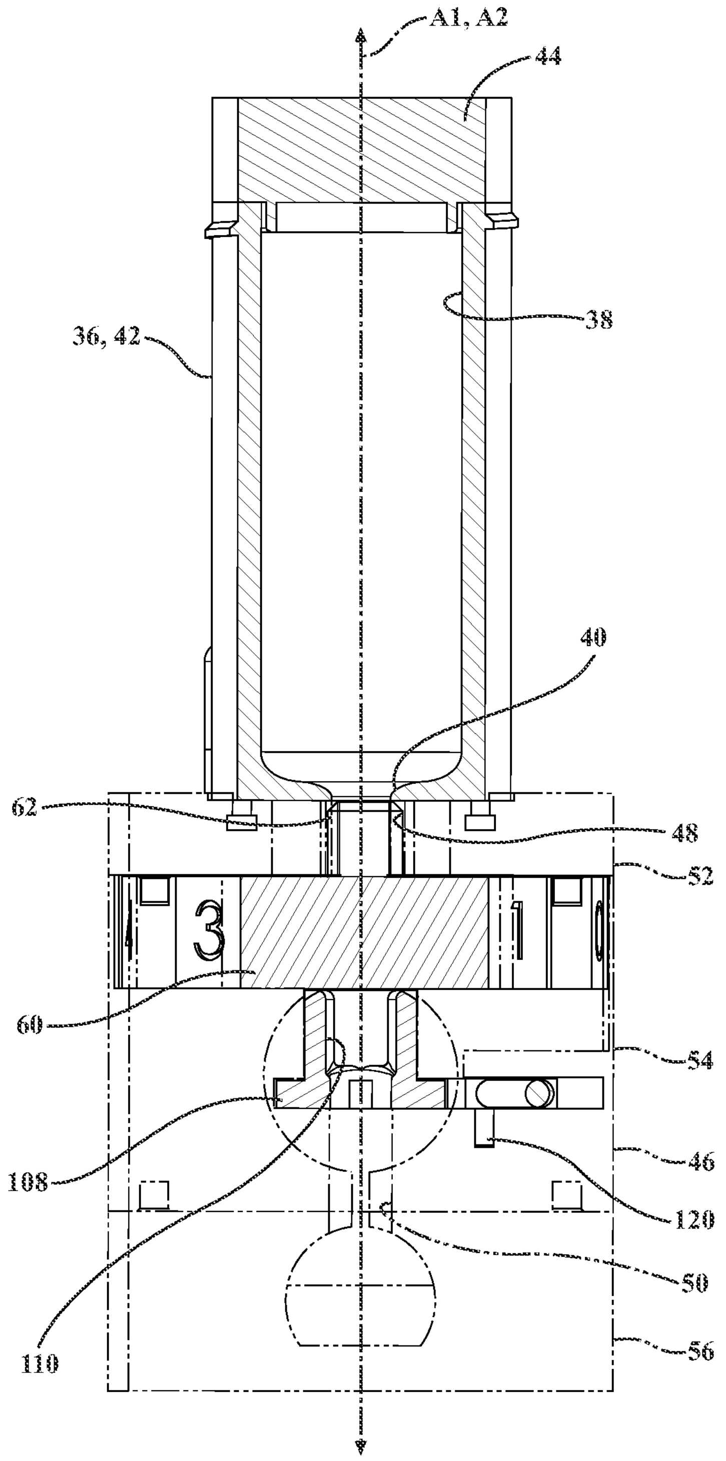
FIG. 6 is a front cross-sectional view of the pill dispensing assembly.

To help determine which position the insert 60 is in, the outer insert surface 90 may include indicators 92, such as numeral indicators as shown throughout the FIGS., for indicating which portion of the insert channel 64 is aligned with the pill housing outlet 40 with respect to the pill housing axis A1. The dispensing housing 46 may define a dispensing window 94, as best shown in FIG. 3, such that a user may view the indicators 92 on the insert 60.

Figure 9:
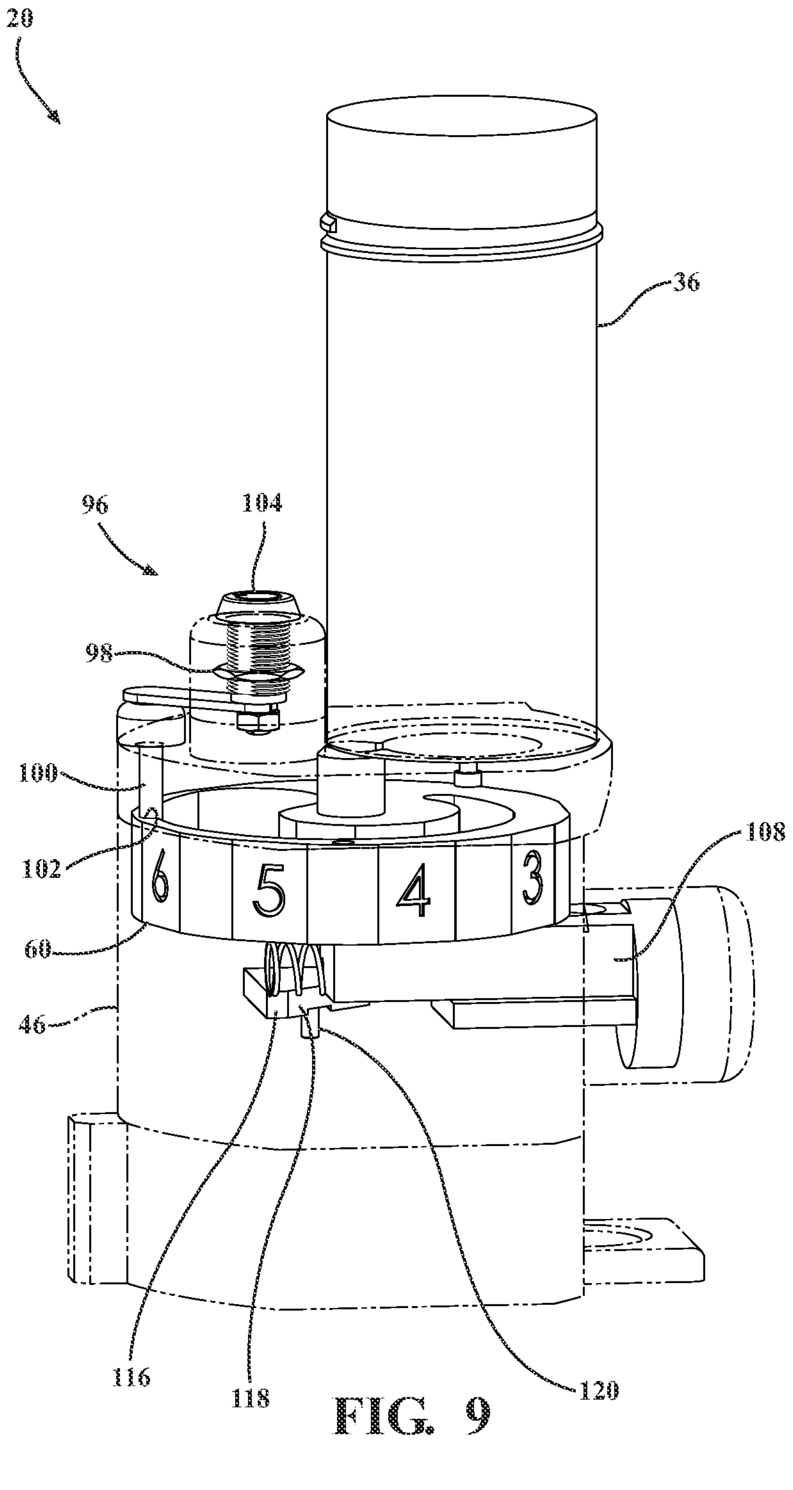
FIG. 9 is side view of the pill dispensing assembly, with the dispensing housing shown in phantom, and including a locking assembly.

The pill dispensing assembly 20 may further include a locking assembly 96 configured to lock the insert 60 in at least one of the first position and the block position, as shown in FIG. 9. The locking assembly 96 may include a locking biasing member 98 and a locking pin 100 coupled to the locking biasing member 98. When present, the locking pin 100 is engageable, such as slidably engageable, with the insert 60 to lock the insert 60 in the first position or block position. For example, the insert 60 may define a locking hole 102. Having the locking assembly 96 present allows the insert 60 to be locked in the desired position, which, in turn, can prevent certain pills from passing from the pill housing interior 38 through the pill housing outlet 40 and to the dispensing housing outlet 50. In particular, locking the insert 60 in the block position will prevent any pills from passing through the insert channel 64, which may act as a safety mechanism to prevent the unwanted dispensing of pills. The locking assembly 96 may include key hole 104 for accepting a key to lock and unlock the locking assembly 96, such as removing the locking pin 100 from the locking hole 102. To store the key, the pill dispensing housing 46 may define a key channel 106.

Figure 7A:
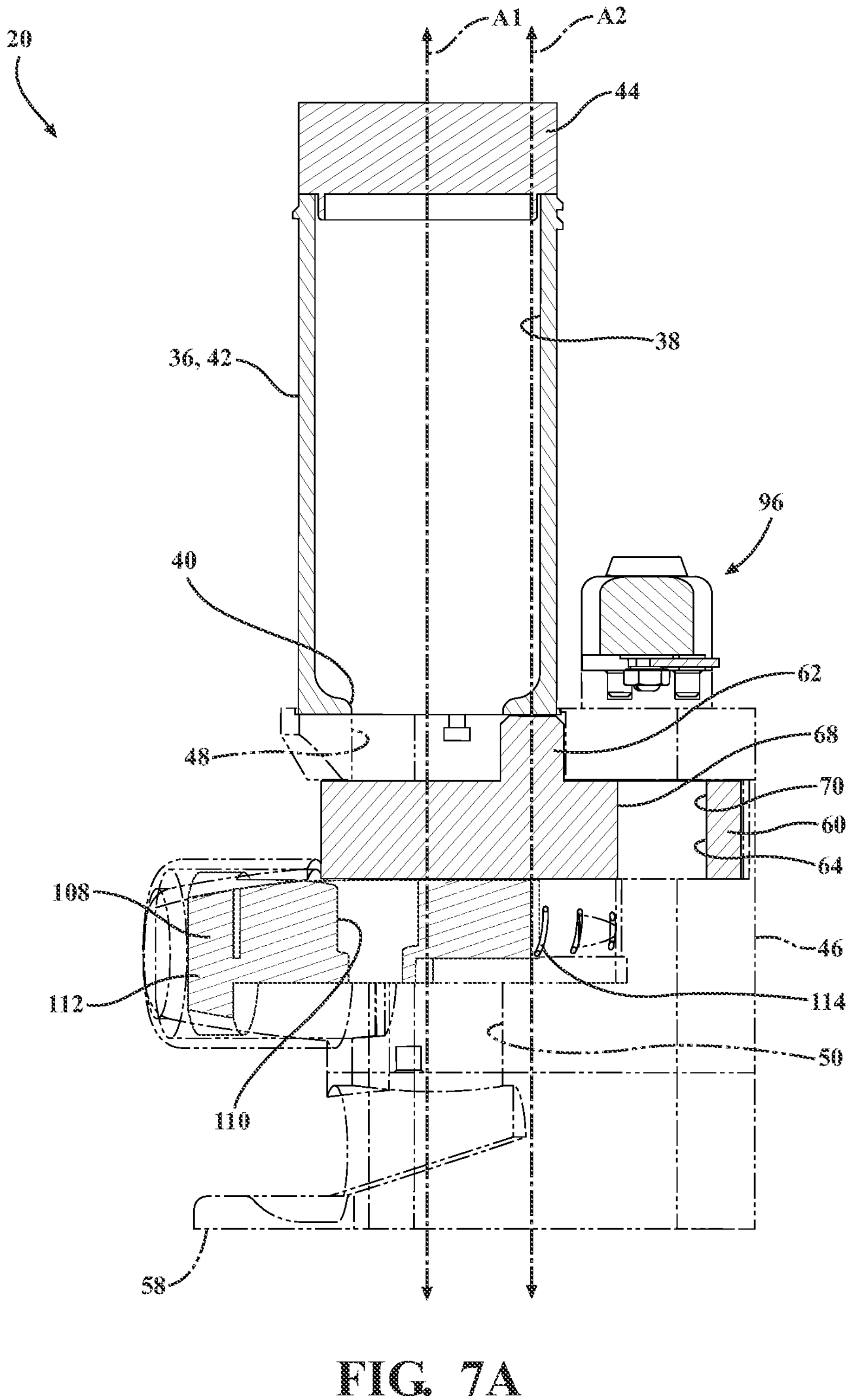
FIG. 7A is side cross-sectional view of the pill dispensing assembly, with the pill housing defining a pill housing interior and a pill housing outlet, with the insert defining an insert channel, with the second insert defining a second insert channel, with the dispensing housing shown in phantom and defining a dispensing inlet and a dispensing outlet, with the second insert in an example first position, and with the insert in an example blocking position.
Figure 7B:
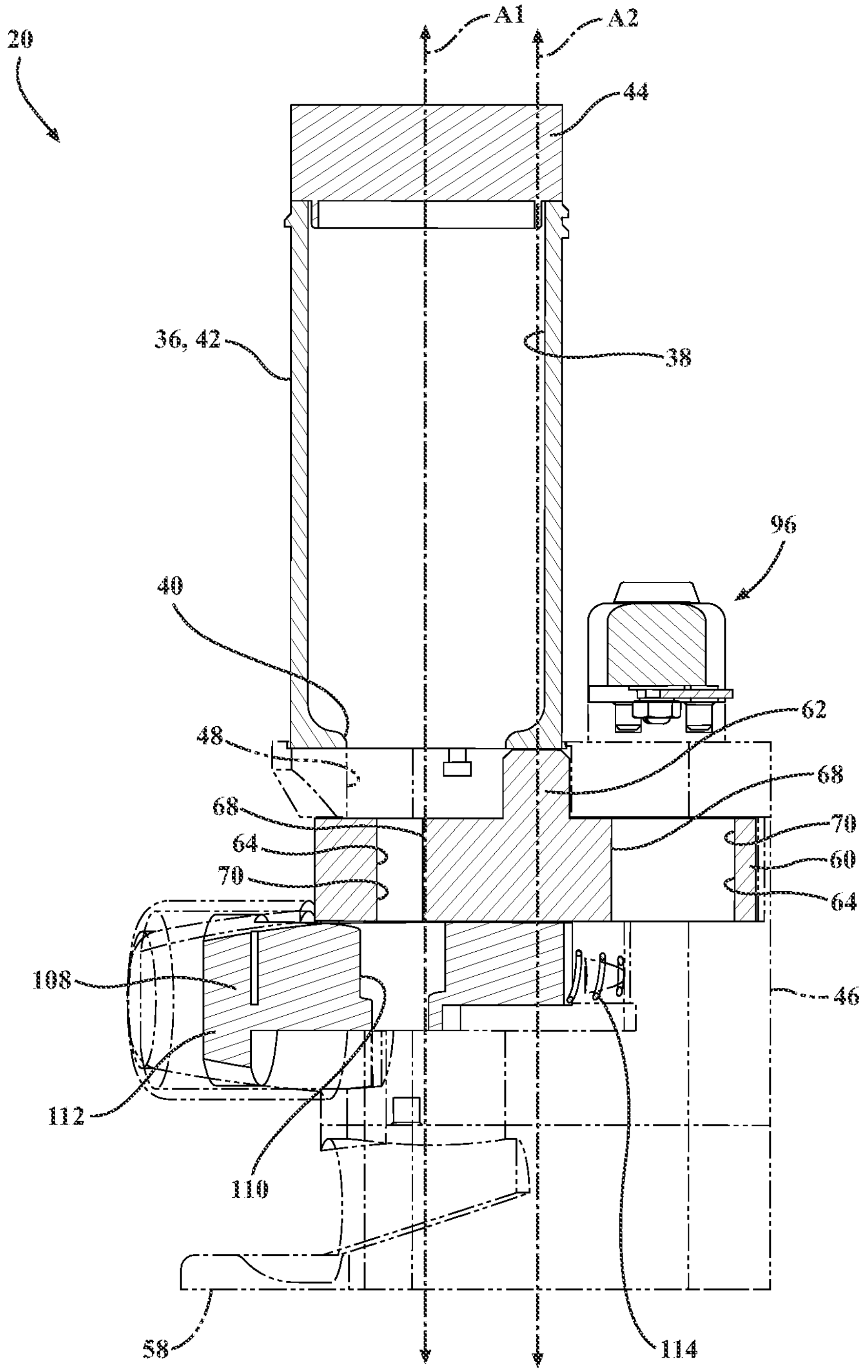
FIG. 7B is a side cross-sectional view of the pill dispensing assembly, with the dispensing housing shown in phantom, with the second insert in an example second position, and with the insert in an example first position.
Figure 7C:
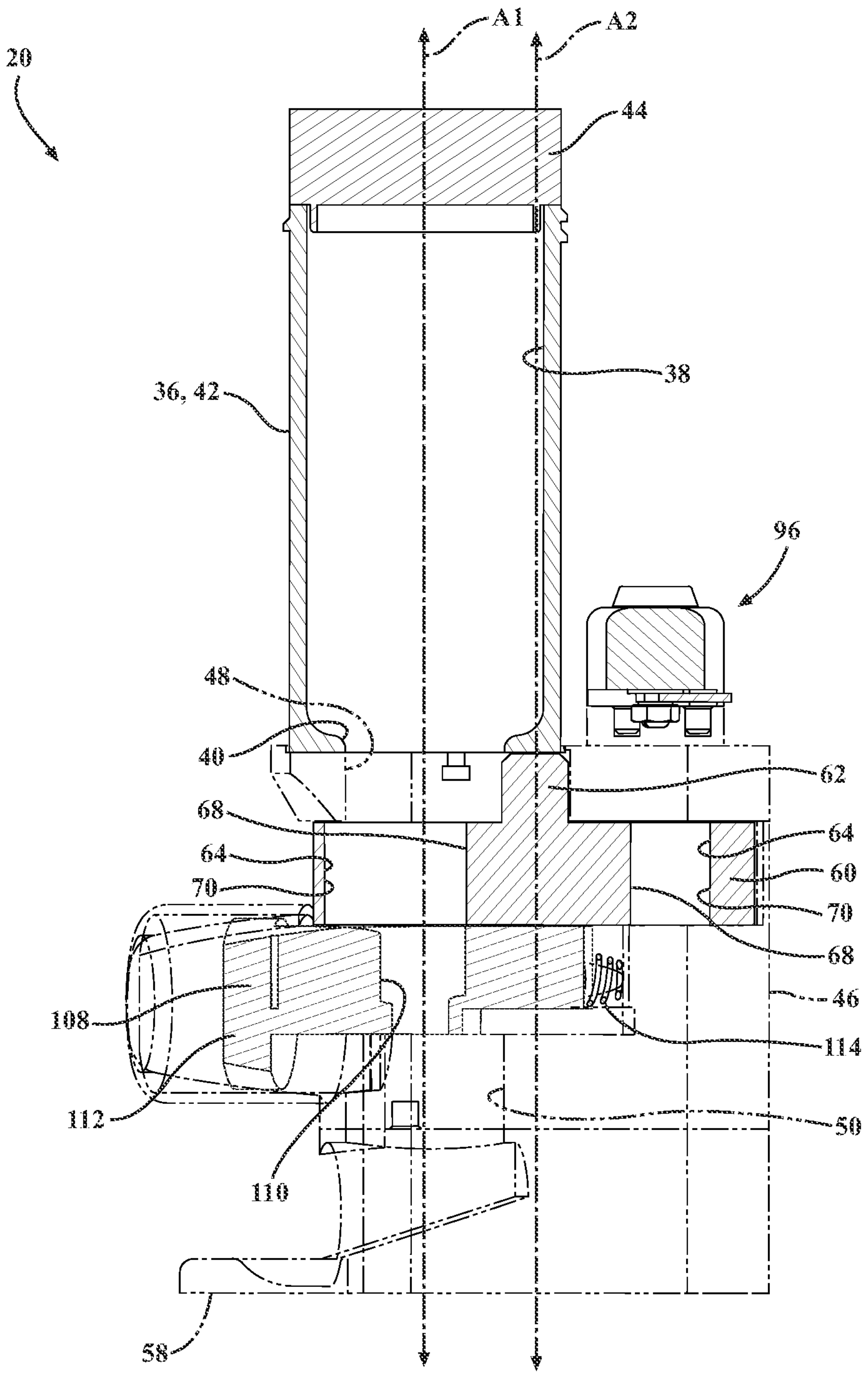
FIG. 7C is a side cross-sectional view of the pill dispensing assembly, with the dispensing housing shown in phantom, with the second insert in an example third position, and with the insert in an example second position.

In some embodiments, the pill dispensing assembly 20 includes a second insert 108 that is coupled to and disposed between the insert 60 and the dispensing housing outlet 50 with respect to the pill housing axis A1. The second insert 108 defines a second insert channel 110, as shown in FIGS. 7A-7C, that is alignable with the insert channel 64. The second insert 108 is moveable between a first position where the second insert channel 110 is aligned with the insert channel 64 with respect to the insert axis A2, and a second position different from the first position where the second insert channel 110 is unaligned with the insert channel 64 with respect to the insert axis A2. Typically, the second insert 108 is moveable between the first and second positions transverse to the insert axis A2, as shown in FIGS. 7A and 7B. The second insert 108 may also be moveable to a third position different from the first and second positions, as shown in FIG. 7C. It is to be appreciated that the description above with respect to FIGS. 10A-10I also applies to the second insert 108. Specifically, as shown throughout FIGS. 10A-10I, the insert channel 64 and the second insert channel 110 are alignable with one another with respect to the insert axis A2 such that the first cross-sectional area 72, the second cross-sectional area 74, the third cross-sectional area 76, the fourth cross-sectional area 78, the fifth cross-sectional area 80, the sixth cross-sectional area 82, the seventh cross-sectional area 84, and the eighth cross-sectional area 86, as shown in FIGS. 10A-10H, respectively, is aligned with the second insert channel 110 with respect to the insert axis A2.

The pill dispensing assembly 20 may further include a push button 112 coupled to the second insert 108. It is to be appreciated that the push button 112 may be integral with the second insert 108 (i.e., one piece) or the push button 112 may be a separate component from the second insert 108. The pill dispensing assembly 20 may include an insert biasing member 114 coupled to the second insert 108 and configured to bias the second insert 108 toward the second position.

Figure 8A:
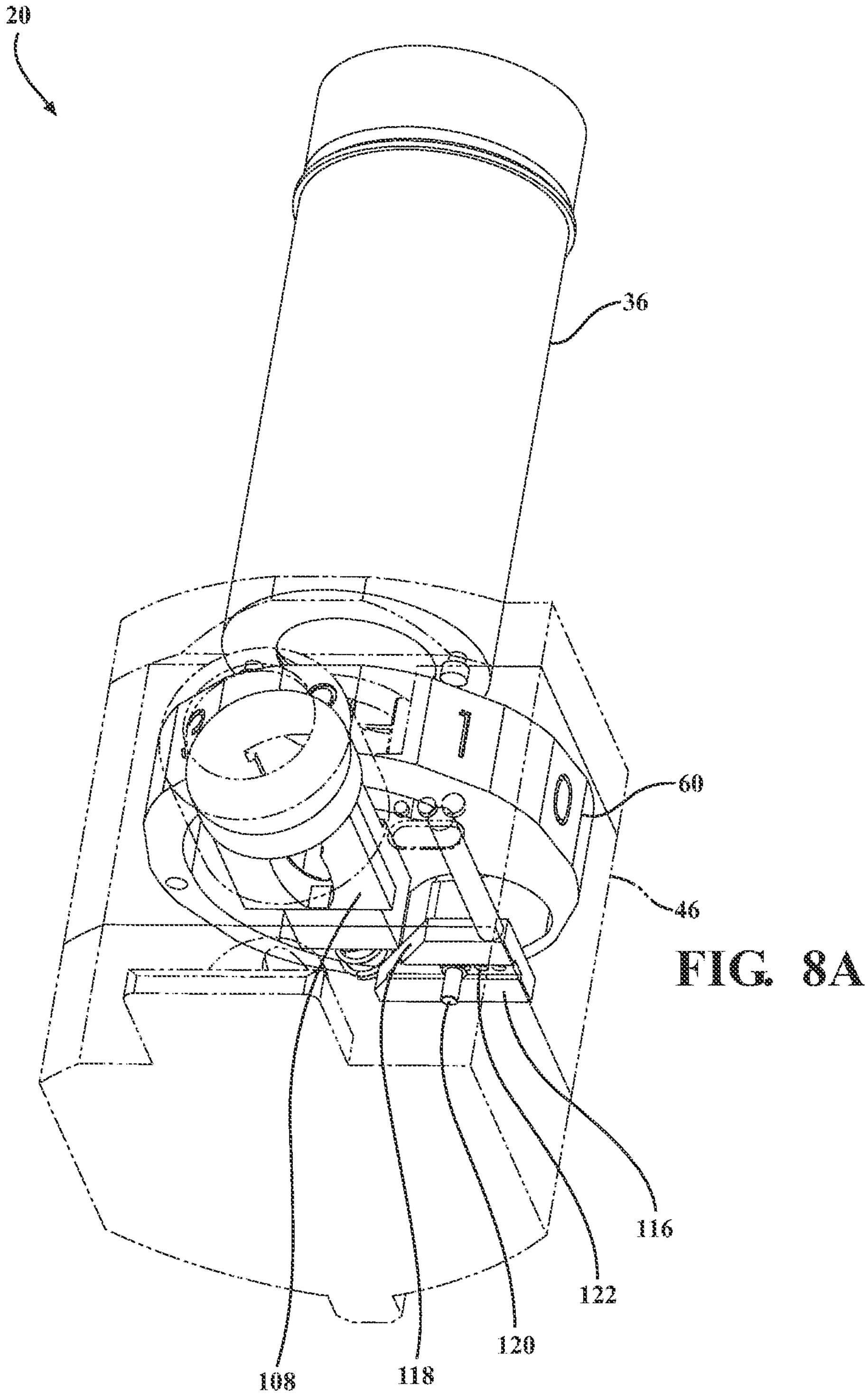
FIG. 8A is a bottom perspective view of the pill dispensing assembly, with the dispensing housing shown in phantom, and including a third insert engageable with the second insert, and with the third insert in an example first position.
Figure 8B:
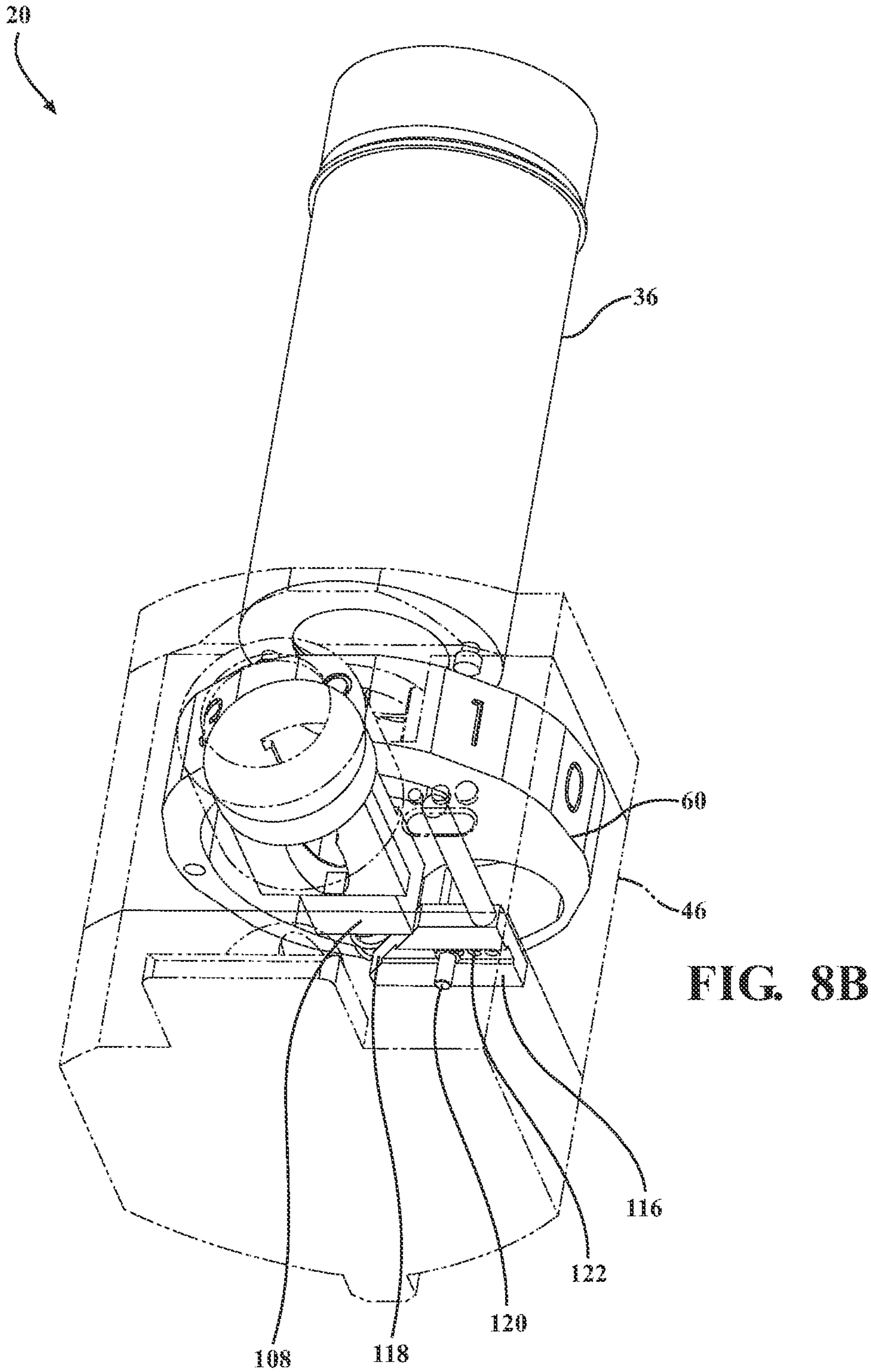
FIG. 8B is a bottom perspective view of the pill dispensing assembly, with the dispensing housing shown in phantom, and with the third insert in an example second position.
Figure 8C:
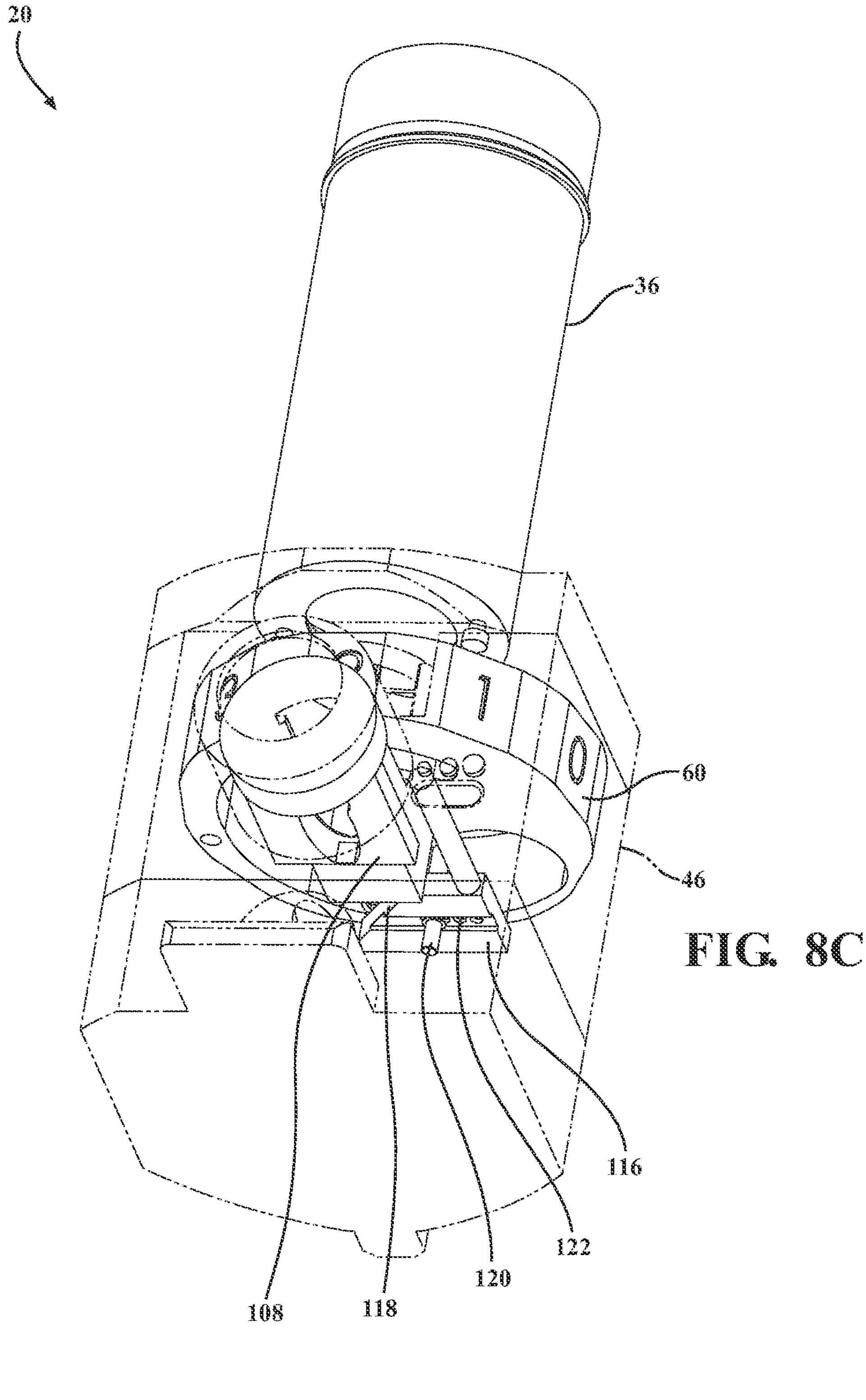
FIG. 8C is a bottom perspective view of the pill dispensing assembly, with the dispensing housing shown in phantom, and with the third insert in an example third position.

The pill dispensing assembly 20 may also include a third insert 116, as best shown in FIGS. 8A-8C and 12, that is engageable with the second insert 108. The third insert 116 selectively limits movement of the second insert 108, for example, selectively limit movement of the second insert 108 transverse to the insert axis A2. The third insert 116 may have an insert surface 118 that is angled with respect the insert axis A2 and is engageable with the second insert 108. The third insert 116 may be moveable transverse to the insert axis A2. As shown in FIGS. 8A-8C, the third insert 116 may limit movement of the second insert 108. The third insert 116 may have a handle 115 for moving the third insert 116 between a first and second position, as shown in FIGS. 8A and 8B, and the third insert 116 may also be moveable into a third position as shown in FIG. 8C. Having the third insert 116 limit movement of the second insert 108 allows the user to select the desired coarse of the pill to dispense. The pill dispensing assembly 20 may also include a plunger 120, such as a shaft, engageable with the third insert 116 to secure the third insert 116 in the desired position. The third insert 116 may define insert holes 122, with the plunger 120 being engageable with the insert holes 122.

To select the size pill to dispense from the pill dispensing assembly 20, the insert 60, second insert 108, and third insert 116 may be adjusted to obtain the desired pill. As described above, the insert 60 may be moved with respect to the insert axis A2, such as rotating about the insert axis A2, to align the desired cross-sectional area of the insert channel 64 with the pill housing outlet 40 and the second insert channel 110, as shown in FIGS. 10A-10I. Then, to dispense the pill or pills, the second insert 108 moves toward the insert axis A2, as shown in FIGS. 7A-7C. Depending on how far the second insert 108 moves toward the insert axis A2 will help determine what size pill is dispensed from the pill dispensing assembly 20. To control the movement of the second insert 108 toward the insert axis A2, the third insert 116 may be moved into one of the positions shown in FIGS. 8A-8C. To this end, the insert channel 64 and the second insert channel 110 are selectively aligned to allow the desired pill to be dispensed from the pill dispensing assembly 20.

What is claimed is:

1. A pill dispensing assembly for dispensing pills, said pill dispensing assembly comprising:

- a pill housing extending along a pill housing axis and defining a pill housing interior configured to retain pills for dispensing and a pill housing outlet configured to allow dispensing of the pills;
- a dispensing housing coupled to said pill housing, wherein said dispensing housing defines a dispensing housing outlet spaced from said pill housing outlet with respect to said pill housing axis; and
- an insert extending along and moveable with respect to an insert axis and disposed between said pill housing outlet and said dispensing housing outlet with respect to said pill housing axis;
- wherein said insert defines an insert channel that is alignable with said pill housing outlet for regulating the movement of pills passing from said pill housing interior, to said pill housing outlet, and to said dispensing housing outlet;
- wherein said insert channel has a channel cross-sectional area, wherein said insert is moveable into a first position and a second position different from said first position with respect to said dispensing housing, wherein, when said insert is in said first position, said channel cross-sectional area has a first cross-sectional area that is aligned with said pill housing outlet with respect to said pill housing axis, wherein, when said insert is in said second position, said channel cross-sectional area has a second cross-sectional area that is aligned with said pill housing outlet with respect to said pill housing axis, and wherein said second cross-sectional area is greater than said first cross-sectional area.

2. The pill dispensing assembly as set forth in claim 1, wherein said insert channel is disposed about said insert axis.

3. The pill dispensing assembly as set forth in claim 2, wherein said insert channel spirals about said insert axis.

4. The pill dispensing assembly as set forth in claim 2, wherein said insert channel has a channel cross-sectional area, and wherein said cross-sectional area changes radially about said insert axis.

5. The pill dispensing assembly as set forth in claim 1, said channel cross-sectional area changes radially about said insert axis.

6. The pill dispensing assembly as set forth in claim 1, wherein said insert channel is continuously defined between said first cross-sectional area and said second cross-sectional area.

7. The pill dispensing assembly as set forth in claim 1, wherein said insert is moveable into a third position different from said second position with respect to said dispensing housing, wherein, when said insert is in said third position, said channel cross-sectional area has a third cross-sectional area that is aligned with said pill housing outlet with respect to said pill housing axis, wherein said third cross-sectional area is greater than said second cross-sectional area.

8. The pill dispensing assembly as set forth in claim 7, wherein said insert channel is continuously defined between said first cross-sectional area, said second cross-sectional area, and said third cross-sectional area.

9. The pill dispensing assembly as set forth in claim 8, wherein said insert is moveable into a fourth position different from said third position with respect to said dispensing housing, wherein, when said insert is in said fourth position, said channel cross-sectional area has a fourth cross-sectional area that is aligned with said pill housing outlet with respect to said pill housing axis, wherein said fourth cross-sectional area is greater than said third cross-sectional area.

10. The pill dispensing assembly as set forth in claim 1, wherein said insert is moveable between a first position and a block position, wherein, when in said first position, said insert channel is aligned with said pill housing outlet with respect to said pill housing axis for allowing pills to through said pill housing outlet and through said insert channel, wherein said insert comprises a blocking portion extending between said insert axis and an outer insert surface of said insert, and wherein, when said insert is in said block position, said blocking portion of said insert prevents pills from moving from said pill housing outlet to said dispensing housing outlet.

11. The pill dispensing assembly as set forth in claim 10, further comprising a locking assembly configured to lock said insert in at least one of said first position and said block position.

12. The pill dispensing assembly as set forth in claim 11, wherein said locking assembly comprises a locking biasing member and a locking pin coupled to said biasing member, and wherein said locking pin is engageable with said insert to lock said insert in said first or block position.

13. The pill dispensing assembly as set forth in claim 1 further comprising a second insert coupled to and disposed between said insert and said dispensing housing outlet with respect to said insert axis, wherein said second insert defines a second insert channel that is alignable with said insert channel.

14. The pill dispensing assembly as set forth in claim 13, wherein said second insert is moveable between a first position where said second insert channel is aligned with said insert channel, and a second position where said second insert channel is unaligned with said insert channel.

15. The pill dispensing assembly as set forth in claim 14, wherein second insert is moveable between said first and second positions transverse to said insert axis.

16. The pill dispensing assembly as set forth in claim 13 further comprising a third insert engageable with said second insert, wherein said third insert selectively limits movement of said second insert.

17. The pill dispensing assembly as set forth in claim 1, wherein said insert is configured as a disc.

18. The pill dispensing assembly as set forth in claim 1, wherein said insert axis and said pill housing axis are parallel to one another.

19. A pill dispensing module for dispensing pills, said pill dispensing module comprising:
- a module housing; and
- at least two of said pill dispensing assemblies as set forth in claim 1.

20. The pill dispensing module as set forth in claim 19, wherein said module housing defines a plurality of pockets, and wherein said at least two of said pill dispensing assemblies are disposed in one pocket of said plurality of pockets.

21. A pill dispensing assembly for dispensing pills, said pill dispensing assembly comprising:
- a pill housing extending along a pill housing axis and defining a pill housing interior configured to retain pills for dispensing and a pill housing outlet configured to allow dispensing of the pills;
- a dispensing housing coupled to said pill housing, wherein said dispensing housing defines a dispensing housing outlet spaced from said pill housing outlet with respect to said pill housing axis; and
- an insert extending along and moveable with respect to an insert axis and disposed between said pill housing outlet and said dispensing housing outlet with respect to said pill housing axis;
- wherein said insert defines an insert channel that is alignable with said pill housing outlet for regulating the movement of pills passing from said pill housing interior, to said pill housing outlet, and to said dispensing housing outlet;
- wherein said insert is moveable between a first position and a block position, wherein, when in said first position, said insert channel is aligned with said pill housing outlet with respect to said pill housing axis for allowing pills to through said pill housing outlet and through said insert channel, wherein said insert comprises a blocking portion extending between said insert axis and an outer insert surface of said insert, and wherein, when said insert is in said block position, said blocking portion of said insert prevents pills from moving from said pill housing outlet to said dispensing housing outlet;
- wherein said pill dispensing module further comprises a locking assembly configured to lock said insert in at least one of said first position and said block position; and
- wherein said locking assembly comprises a locking biasing member and a locking pin coupled to said biasing member, and wherein said locking pin is engageable with said insert to lock said insert in said first or block position.

22. A pill dispensing assembly for dispensing pills, said pill dispensing assembly comprising:
- a pill housing extending along a pill housing axis and defining a pill housing interior configured to retain pills for dispensing and a pill housing outlet configured to allow dispensing of the pills;
- a dispensing housing coupled to said pill housing, wherein said dispensing housing defines a dispensing housing outlet spaced from said pill housing outlet with respect to said pill housing axis; and
- an insert extending along and moveable with respect to an insert axis and disposed between said pill housing outlet and said dispensing housing outlet with respect to said pill housing axis;
- wherein said insert defines an insert channel that is alignable with said pill housing outlet for regulating the movement of pills passing from said pill housing interior, to said pill housing outlet, and to said dispensing housing outlet; and
- wherein said pill dispensing assembly further comprises a second insert coupled to and disposed between said insert and said dispensing housing outlet with respect to said insert axis, wherein said second insert defines a second insert channel that is alignable with said insert channel, and further comprises a third insert engageable with said second insert, wherein said third insert selectively limits movement of said second insert.

23. The pill dispensing assembly as set forth in claim 22, wherein said third insert has an insert surface that is angled with respect to said insert axis and is engageable with said second insert, and wherein said third insert is moveable transverse to said insert axis.

* * * * *